US011472393B2

(12) United States Patent
Mallmann et al.

(10) Patent No.: US 11,472,393 B2
(45) Date of Patent: Oct. 18, 2022

(54) COUPLING DEVICE FOR A BRAKE FLUID RESERVOIR AND VEHICLE BRAKE SYSTEM

(71) Applicant: ZF Active Safety GmbH, Koblenz (DE)

(72) Inventors: Markus Mallmann, Pfalzfeld (DE); Marcus Janson, Koblenz (DE)

(73) Assignee: ZF Active Safety GmbH, Koblenz (DE)

( * ) Notice: Subject to any disclaimer, the term of this patent is extended or adjusted under 35 U.S.C. 154(b) by 698 days.

(21) Appl. No.: 16/454,922

(22) Filed: Jun. 27, 2019

(65) Prior Publication Data

US 2020/0010069 A1  Jan. 9, 2020

(30) Foreign Application Priority Data

Jul. 4, 2018  (DE) .......................... 102018005306.8

(51) Int. Cl.
| | |
|---|---|
| *B60T 17/06* | (2006.01) |
| *F16B 5/06* | (2006.01) |
| *B60T 11/22* | (2006.01) |
| *B60T 11/26* | (2006.01) |
| *F16B 21/06* | (2006.01) |

(52) U.S. Cl.
CPC ............... *B60T 17/06* (2013.01); *B60T 11/22* (2013.01); *B60T 11/26* (2013.01); *F16B 5/0635* (2013.01); *F16B 21/065* (2013.01)

(58) Field of Classification Search
CPC .......... B60T 11/22; B60T 11/26; B60T 17/06; F16B 5/0635; F16D 21/065
See application file for complete search history.

(56) References Cited

U.S. PATENT DOCUMENTS 4,174,786 A * 11/1979 Fujii ....................... B60T 11/22
  277/606
4,337,792 A *  7/1982 Nomura .................. B60T 11/22
  137/854

(Continued)

FOREIGN PATENT DOCUMENTS

| DE | 19921195 B4 | 12/2005 |
| DE | 102007041500 A1 | 3/2009 |
| DE | 102007049913 B4 | 7/2009 |

(Continued)

*Primary Examiner* — Thomas J Williams
(74) *Attorney, Agent, or Firm* — Robert James Harwood

(57) ABSTRACT

The present disclosure pertains to a coupling device for coupling a fluid reservoir for a brake fluid with a brake actuation device. The coupling device includes at least one coupling extension provided at the fluid reservoir with a first recess, a second recess configured in the area of an edge of the brake actuation device as well as a hole configured in the brake actuation device and open to the second recess, a bridge element crossing the second recess along the edge of the brake actuation device and a coupling element with at least one striker, wherein, when the fluid reservoir is coupled to the brake actuation device, the hole is aligned with the first recess along a central longitudinal axis of the striker and the striker passes through the first recess and engages with the hole. The present disclosure also pertains to a vehicle brake system equipped with such a coupling device.

15 Claims, 11 Drawing Sheets

(56) References Cited

U.S. PATENT DOCUMENTS

| | | |
|---|---|---|
| 2015/0360670 A1 | 12/2015 | Lange |
| 2020/0391712 A1 * | 12/2020 | Mallmann ............... B60T 11/22 |

FOREIGN PATENT DOCUMENTS

| | | | |
|---|---|---|---|
| DE | 102019001321 A1 * | 8/2020 | ............ F16B 5/0635 |
| FR | 2907414 A1 * | 4/2008 | ............ F16B 21/065 |
| FR | 2908097 A1 * | 5/2008 | ............. B60T 11/26 |
| GB | 1032307 A | 6/1966 | |
| WO | 2014114487 A2 | 7/2014 | |

\* cited by examiner

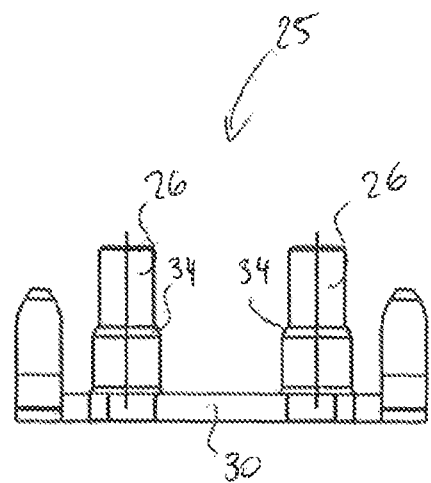
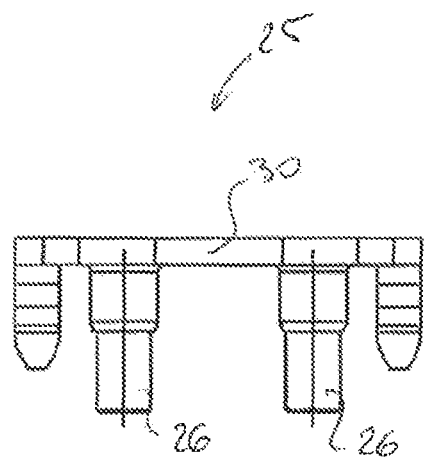
Fig. 6a
Fig. 6c
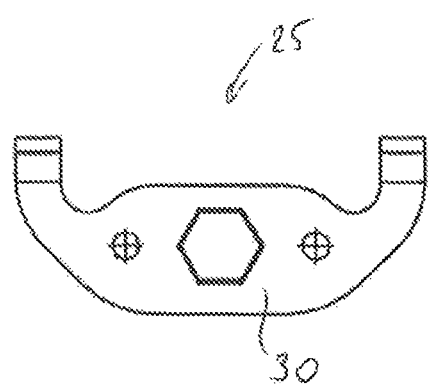
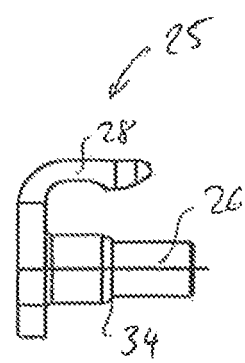
Fig. 6b
Fig. 6d

COUPLING DEVICE FOR A BRAKE FLUID RESERVOIR AND VEHICLE BRAKE SYSTEM

CROSS-REFERENCE TO RELATED APPLICATIONS

This application claims priority to German Patent Application No. 102018005306.8, filed 4 Jul. 2018, the disclosure of which is incorporated herein by reference in its entirety.

TECHNICAL FIELD

The present disclosure relates to a coupling device for coupling a fluid reservoir for brake fluid to a brake actuation device as well as a vehicle brake system equipped with such a coupling device.

BACKGROUND

For braking a vehicle, brake fluid is compressed from a fluid reservoir in a brake pressure control device or brake actuation device, for example in a brake master cylinder, in hydraulic brake systems so as to build up brake pressure in the brake lines of one or several brake circuits connected with the wheel brakes and the master cylinder. With the aid of a hydraulic brake booster, the hydraulic pressure can be increased. To prevent a lockup of a vehicle wheel, the brake pressure to the respective wheel brake can be selectively decreased. In state-of-the-art brake systems for passenger vehicles or trucks, the components fluid reservoir and brake master cylinder are usually. installed in the engine compartment, thus taking up installation space there. In addition, these components are subject to relatively high temperature fluctuations and high mechanical stress, particularly at initial filling.

For example, an installation of a fluid reservoir at a brake master cylinder is known from the document WO 2014/114487 A2 describing a fluid reservoir consisting of two hollow bodies welded together. The upper one of these hollow bodies displays a filler neck providing access for refilling and is lockable with a cap. On the bottom of the lower one of these hollow bodies are two fittings, with which it can be coupled to the brake master cylinder guiding fluid and sealing, as is known. On the bottom of the lower hollow body, two coupling arms are also installed, between which a mounting hole of the brake master cylinder can be inserted.

Against this backdrop, there is a need to provide a coupling device for coupling a brake fluid reservoir to a brake actuation device, which requires less installation space and allows for coupling of the fluid reservoir to the brake actuation device and quickly and easily disconnecting it from it.

SUMMARY

The present disclosure provides for a coupling device which couples a brake fluid reservoir to a brake actuation device, for example to a hydraulic block and/or a brake master cylinder of the brake actuation device, intended for and comprised of at least one coupling extension at the fluid reservoir with a first recess, a second recess positioned in the area of one edge of the brake actuation device as well as an opening positioned in the brake actuation device and open to the second recess. The coupling device also displays a bridge element entirely or partially crossing the second recess along the edge of the brake actuation device and a coupling element with at least one striker. When the fluid reservoir is coupled to the brake actuation device, the hole is aligned with the first recess along a central longitudinal axis of the striker. Concurrently, the striker pushes through the first recess and is in mesh with the hole. The striker is preferably positioned cylindrically and/or pin shaped.

For example, the coupling extension can be positioned integrally, particularly from one piece of material/from one casting, with the fluid reservoir. The manufacturing of the fluid reservoir from one piece of material/from one casting with the coupling extension can easily be done by joint injection moulding of the fluid reservoir and the coupling extension. Accordingly, the bridge element can be positioned integrally, particularly from one piece of material/from one casting, with the brake actuation device. Alternatively, the coupling extension can be attached to the fluid reservoir and/or the bridge element to the brake actuation device. It is also conceivable that the bridge element is installed in the second recess and aligned with an exterior surface enclosing the second recess of the brake actuation device. However, the bridge element can also be installed spaced from the edge of the brake actuation device within the second recess.

With the coupling device described, the fluid reservoir can be quickly and easily installed to the brake actuation device, as further specified below, by installing the coupling extension of the fluid reservoir into the second recess and inserting the coupling element into this second recess. The faster installation allows for a more efficient production of the brake system and reduction of production cost. The fluid reservoir can also be easily decoupled from the brake actuation device by removing the coupling element from the second recess. In addition, the coupling element can be positioned small so that the coupling device will take up little installation space. The saved installation space will be available for other components of the brake system and/or of the vehicle. In addition, the coupling element can be positioned separately from the bridge element, from the coupling extension and/or from the brake actuation device. Particularly, if the coupling element is configured as a separate component, it can be quickly and cost-effectively manufactured in large numbers.

The brake fluid should preferably be a hydraulic brake fluid. The brake fluid can be poured into the fluid reservoir through its filler opening installed vertically above the brake actuation device. The filler opening is preferably positioned at one end of the brake actuation device opposite to the fluid reservoir. In one embodiment, the filler opening is installed at a filler neck of the fluid reservoir leading to a flat section of the fluid reservoir. A neck section with a flange or supporting surface on its end facing the brake actuation device connects the flat section of the fluid reservoir with the brake actuation device. The flange or supporting surface should preferably rest flat on a surface of the brake actuation device facing the fluid reservoir so that a connection to the brake actuation device sealed and pressure-resistant for the brake fluid can be established. The fluid reservoir also serves as an expansion reservoir for the volume increase of the brake circuits as part of wear-induced reduction of the brake-lining thickness.

The brake actuation device can show a hydraulic block, which should preferably be part of a brake circuit of the brake system and be coupled for actuation of one or several hydraulic wheel brakes carrying fluid to the latter. The brake actuation device/hydraulic block can show a housing with a first fluid connection to the fluid reservoir and a second fluid connection to a hydraulic line of the brake system. For this purpose, the brake actuation device should preferably be set up for pressurizing the brake fluid. The brake actuation device can show additional fluid connections configured like the second fluid connection showing any of its features.

In addition, the brake actuation device can show a brake master cylinder, a pump, particularly a piston pump, and/or an additional brake cylinder, whose piston can be driven by an electric motor. The brake master cylinder should preferably be configured as a tandem brake master cylinder. The brake master cylinder, the pump, and/or the additional brake cylinder can each be integrated in sections or entirely in the housing of the brake actuation device. The electric motor can be installed in sections outside of the housing. A drive shaft of the electric motor can protrude into the housing.

In one embodiment, the coupling extension is configured as a flat tab. The flat tab should preferably extend in a principal plane parallel to the principal extension direction of the bridge element. The coupling extension can extend from the fluid reservoir in mounting position vertically downward in the direction of the brake actuation device. The first recess can be positioned as a through bore and specifically installed adjacent to the end of the coupling extension facing the brake actuation device. The first recess should preferably run essentially vertically to the principal plane of the flat tab and through it.

In a preferred variant, the hole open to the second recess is configured as a blind hole, or better blind bore. When the coupling device is installed, in which the fluid reservoir is coupled to the brake actuation device, the hole should preferably be aligned with the first recess along the central longitudinal axis of the striker. Aligning means preferably here that the overlap between the first recess and the hole in the plane vertically to the central longitudinal axis of the striker is at least so large that the striker can push through the first recess and engage in the hole. The center of the first recess and the center of the hole can hereby rest concentrically to each other on the central longitudinal axis of the striker. It should, however, be noted that it is not necessary that the first recess and the hole have the same diameter.

For this purpose, the coupling element is preferably configured so that the coupling extension is secured in the second recess, when the fluid reservoir is coupled to the brake actuation device. For this purpose, particularly the coupling element can be positively connected with the coupling extension and the brake actuation device. Therefore, the striker is preferably configured in its end section facing the hole complementarily to the hole. If this hole is configured as a bore, the striker should then preferably have a cylindrical shape in its end section. The striker can also show a abutment surface extending along its outer circumferential surface. The abutment surface can be installed in such a way that it rests on the coupling extension or on the brake actuation device, when the fluid reservoir is coupled to the brake actuation device.

The coupling element preferably shows a locking device for keeping the striker meshed with the hole when installed. The locking device prevents unwanted loosening of the coupling element after installation. The locking device should preferably be reversible, i.e. it can be loosened so that the striker can be removed from the first recess to release the coupling extension. This allows for quick and easy removal and, if necessary, replacing of the fluid reservoir. For example, the locking device can engage, particularly catch, at the bridge element, at the coupling extension and/or at the brake actuation device. For this purpose, the locking device has preferably at least one locking arm connected with the striker across a base section, which, for example, is essentially extending parallel to the central longitudinal axis of the striker. In a preferred design, the locking arm is installed spaced apart from the striker, particularly along the surface of the base section.

The locking arm take can be, at least in sections, configured elastically and/or like a clamp. The locking arm can also be configured in such a way that it is engaging at the bridge element and is preferably engaging this behind, when the fluid reservoir is coupled to the brake actuation device. The locking arm can have a locking nose, which, when coupled, is preferably installed spaced further apart from the base section of the coupling element than the bridge element and/or spaced closer than the coupling extension. Alternatively, the locking arm can engage at the coupling extension itself. Particularly, the locking arm can engage the coupling extension behind to secure the coupling element to the coupling extension and keep the striker in the hole at the same time.

The base section can be complementarily configured to the recess. The coupling element can be partially or entirely inserted in the recess, when the coupling device is installed. Particularly, the bridge element can push through the second recess here in such a way that it is aligned with a surface of the brake actuation device facing the fluid reservoir as well as with a surface vertically extending to this surface. In this case, the bridge element is forming an extension of an edge adjacent to the surface facing the fluid reservoir. The second recess can then be open to the surface facing the fluid reservoir via one slit for several coupling extensions or several slits for the coupling extensions. In the direction of the central longitudinal axis of the striker, the second recess, by contrast, is open in the shape of a window, which is configured for the positive mounting of the coupling element, particularly its base section. When coupled, the surface of the base section opposite to the striker is preferably aligned with the surface of the brake actuation device.

When coupled, the bridge element between the base section and the coupling extension and/or between the locking arm and the striker can also be installed. Consequently, the bridge element is forming a stop resistance for the striker to prevent the coupling extension from being pulled out of the recess.

If the coupling element has more strikers, each one of them can be configured like the striker described above and, when the coupling device is coupled, can push through a first recess in the coupling extension allocated to the respective striker and can engage in an open hole allocated to the respective striker for the second recess. This/these first recess/es and this hole or these holes can show each of the characteristics of the first recess described above and of the hole described above, respectively. Particularly, all strikers, all first recesses, and all holes can extend parallel to each other. In a coupling element with several strikers, the strikers preferably are installed equally spaced to the center of the base section.

In addition, the coupling element can be, regardless of one or several strikers, equipped with several locking arms, which are preferably positioned spaced apart from each other. Each of the locking arms can show one or several of the characteristics, particularly equipped with a locking nose. The striker/s is/are, when parallel to a principal plane of the base section, installed closer to the center of the base section than the locking arm. A central longitudinal axis of the bridge element is preferably aligned vertically with the central longitudinal axis of the striker, if the fluid reservoir is coupled to the brake actuation device by the coupling device.

For the assembly of the fluid reservoir at the brake actuation device, the coupling extension is preferably first inserted into the recess essentially in an initial direction vertically to the central longitudinal axis of the bridge element so that the first recess is aligned with the hole open to the second recess. Subsequently, the coupling element is placed into the second recess, wherein the striker is inserted into the second recess. The locking nose of the locking arm comes in contact with the bridge element or the coupling extension here. If the coupling element is moved further into the recess, the locking arm gets warped and locks on the side of the bridge element and the coupling extension, respectively, facing away on the base section. In this end position, the abutment surface preferably rests on the coupling extension and pushes this extension parallel to the central longitudinal axis of the striker in the direction of the brake actuation device. Consequently, the coupling extension is prevented from moving longitudinally or transversely to the central longitudinal axis of the striker. For removal of the fluid reservoir from the brake actuation device, the coupling element can, for example, be pried out of the recess with a flat screwdriver, wherein the locking arm is preferably again elastically warped.

In another embodiment, two or several coupling extensions are provided at the fluid reservoir installed on opposite sides of the bridge element, when the fluid reservoir is coupled to the brake actuation device. Preferably, all coupling extensions are locking into the second recess here. This can be particularly easy achieved, if the second recess is open to the edges of an exterior surface of the brake actuation device. The coupling extensions can each be configured like the coupling extension described above. Particularly, each of these extensions can show a first recess, which is pushed through by the striker, when coupled. The coupling extensions preferably extend parallel to each other. The space from each other can correspond with the diameter of the bridge element measured parallel to the central longitudinal axis of the striker, when coupled so that the coupling extensions are gripping the striker between them.

The striker can be configured as a separate bolt, particularly, if at least two coupling extensions are provided. When coupled, it can be installed entirely on one side of the bridge element opposite to the fluid reservoir. In this case, the bridge element forms a stop for this bolt again so that the coupling extensions can be securely held in the second recess.

An inventive vehicle brake system shows a coupling device described in detail above. In addition, the vehicle brake system can show a line system with one or several hydraulic lines, which each can be connected with a wheel brake of the brake system. For this purpose, the hydraulic lines are preferably set up so that the pressure produced in the brake actuation device can be transmitted to the wheel brake/s for actuation of the wheel brake.

BRIEF DESCRIPTION OF THE DRAWINGS

Hereinafter the present disclosure shall be illustrated in detail by way of an embodiment and with reference to the enclosed drawings, wherein:

FIG. 6a shows the second embodiment coupling element of the coupling device from FIG. 4 in a first side view;

FIG. 6b shows the second embodiment coupling element of the coupling device from FIG. 4 in a second side view;

FIG. 6c shows the second embodiment coupling element of the coupling device from FIG. 4 in a third side view;

FIG. 6d shows the second embodiment coupling element of the coupling device from FIG. 4 in a fourth side view;

DETAILED DESCRIPTION

Figure 1A:
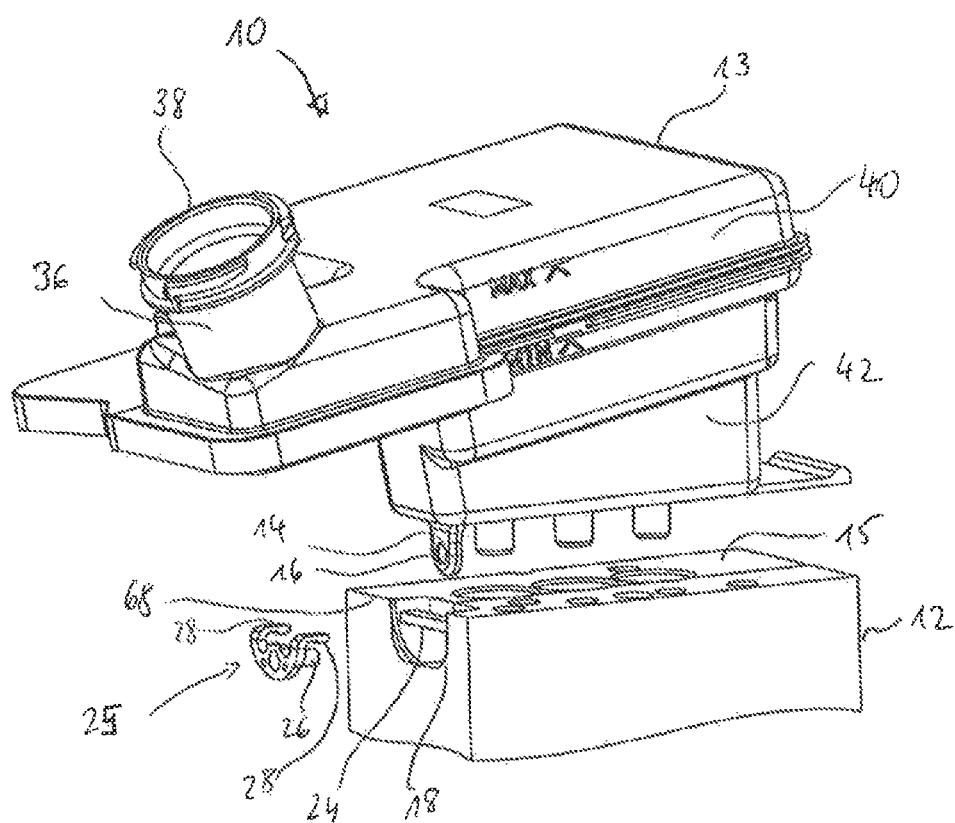
FIG. 1a shows a first embodiment of a coupling device in a perspective comprehensive view and in a perspective detailed view from the front.
Figure 1B:
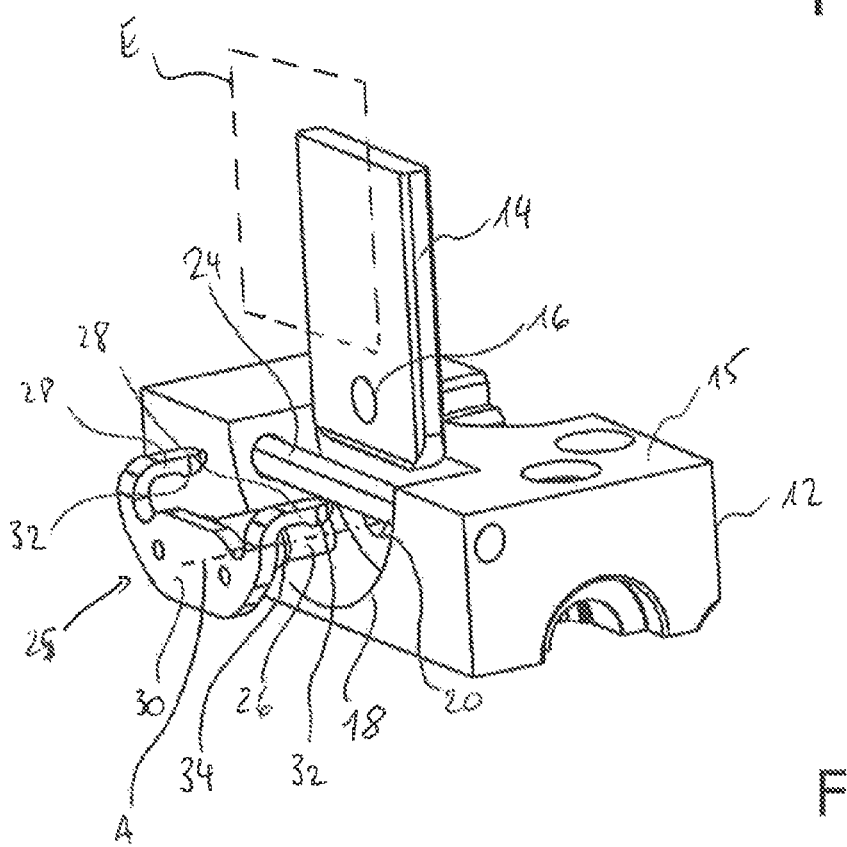
FIG. 1b shows a first embodiment of a coupling device in a perspective comprehensive view and in a perspective detailed view from the front.

FIGS. 1 to 3 are showing a first embodiment of a coupling device 10 for coupling a fluid reservoir 13 for a brake fluid with a brake actuation device 12. The coupling device 10 is comprised of a coupling extension 14 configured at a brake fluid reservoir 13 with a first recess 16, a second recess 18 configured in the area of an edge of the brake actuation device 12 as well as a hole 20 configured in the brake actuation device 12 and open to the second recess 18. A bridge element 24 crosses the second recess 18 along the edge, specifically along an edge 68, of the brake actuation device 12.

The brake actuation device 12 is set up to pressurize fluid from the fluid reservoir 13, if necessary, and shows a fluid connection to the connection with the fluid reservoir 13 on top. The fluid reservoir 13 has a filler neck 36 with a filler opening 38, which leads to a flat fluid reservoir section 40 and is connected with the brake actuation device 12 via a neck section 42. Three outlet ducts not more detailed identified from the fluid reservoir 13 are installed in such a way that each of them corresponds to one inlet opening configured in the brake actuation device 12 respectively, when the fluid reservoir 13 is coupled to the brake actuation device 12.

The coupling extension 14 is configured as a flat tab. It extends in a section plane aligned vertically to the bridge element 24 in the direction of the brake actuation device 12 past one end of the fluid reservoir 13, specifically of the neck section 42, facing the brake actuation device 12 to be able to engage in the second recess 18. The principal plane E of the coupling extension 14 essentially runs parallel to the principal extension direction and central longitudinal axis of the bridge element 24 and vertically to a surface 15 facing the fluid reservoir 13 of the brake actuation device 12. The coupling extension 14 has a first recess 16 installed adjacent to one end of the coupling extension 14 facing the brake actuation device 12 and extending vertically to the principal plane E through the coupling extension 14. The first recess 16 is configured here as an exemplary drill hole.

Figure 2A:
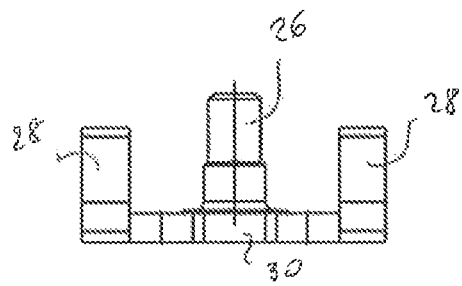
FIG. 2a shows the first embodiment coupling element of the coupling device from FIG. 1 in a first side view.
Figure 2C:
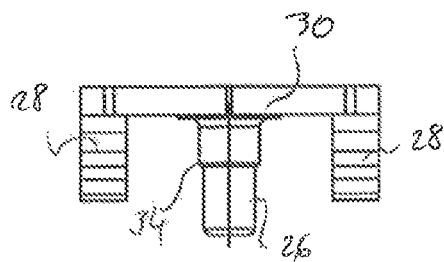
FIG. 2c shows the first embodiment coupling element of the coupling device from FIG. 1 in a third side view.
Figure 2B:
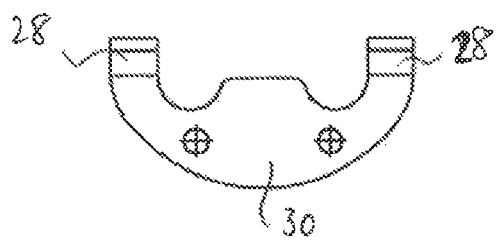
FIG. 2b shows the first embodiment coupling element of the coupling device from FIG. 1 in a second side view.
Figure 2D:
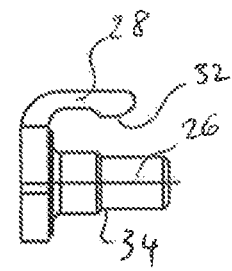
FIG. 2d shows the first embodiment coupling element of the coupling device from FIG. 1 in a fourth side view.
Figure 2E:
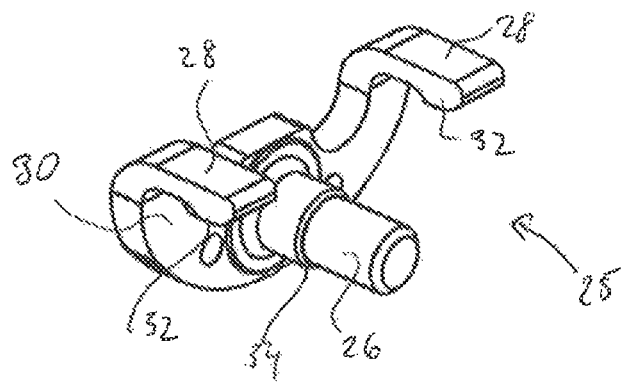
FIG. 2e shows the first embodiment coupling element of the coupling device from FIG. 1 in a perspective detailed view with viewing direction to the striker.

The coupling device 10 is also comprised of a separate coupling element 25 with a striker 26 and two elasticlocking arms 28 connected with the striker 26 by a base section 30 of the coupling element 25. As shown in FIGS. 2a, 2b, and 2d, the striker 26 as well as both locking arms 28 are essentially protruding vertically from the base section 30, running to each other and are spaced apart from each other. Each locking arm 28 is in a direction vertically to the base section 30 shorter than the striker 26 and shows a locking nose 32 at its end facing away from the base section 30, which is locked on a side of the bridge element 24 opposite to the base section 30, when the fluid reservoir 13 is coupled. The striker 26 has an abutment surface 34 extending along its outer circumferential surface and installed in such a way that it rests on the coupling extension 14 on its side facing the base section 30, when the coupling device 10 is fully installed.

To attach the fluid reservoir 13 to the brake actuation device 12, the coupling extension 14 connected with the fluid reservoir 13 is placed between the bridge element 24 and the brake actuation device 12 in the second recess 18 in such a way that the first recess 16 is aligned with the hole 20 along a common axle. Then, the coupling element 25 is moved to the second recess 18 so that the striker 26 is in the first recess 16 allocated to it and engages with the hole 20 allocated to it. The locking noses 32 of the locking arms 28 make contact with the bridge element 24, are displaced from their neutral position shown in FIGS. 1a and 1b and snap into the bridge element 24 after overcoming it, specifically on the side of the bridge element 24 opposite to the base section 30.

Figure 3A:
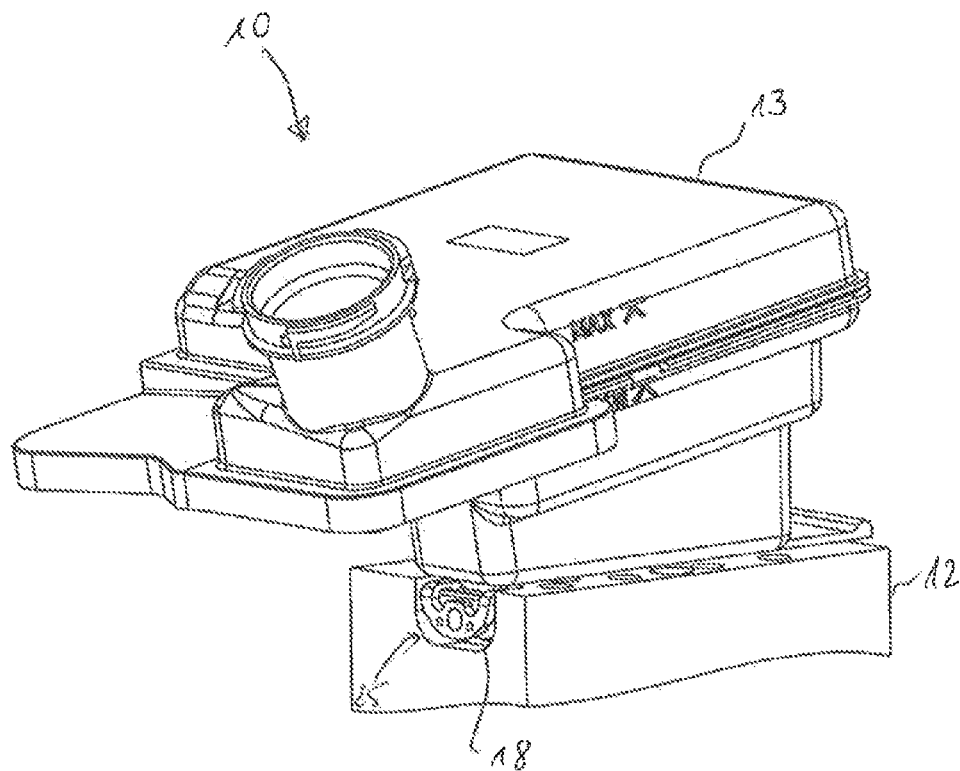
FIG. 3a shows the first embodiment coupling device from FIG. 1 in a first perspective view from the front view with the fluid reservoir coupled to the brake actuation device.
Figure 3B:
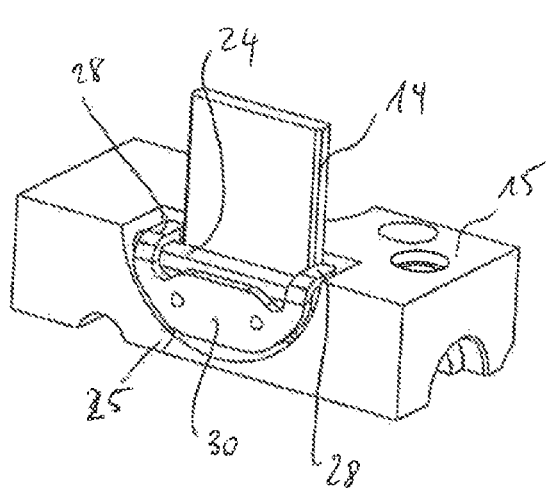
FIG. 3b shows the first embodiment coupling device from FIG. 1 in a second perspective view from the front of the fluid reservoir coupled to the brake actuation device.
Figure 3C:
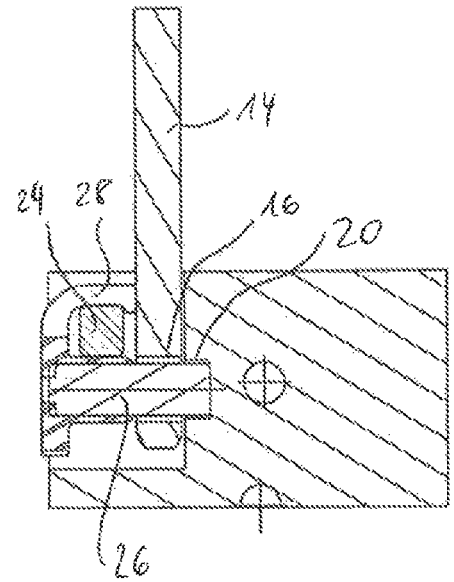
FIG. 3c shows the first embodiment coupling device from FIG. 1 in a cross section view with the fluid reservoir coupled to the brake actuation device.
Figure 4:
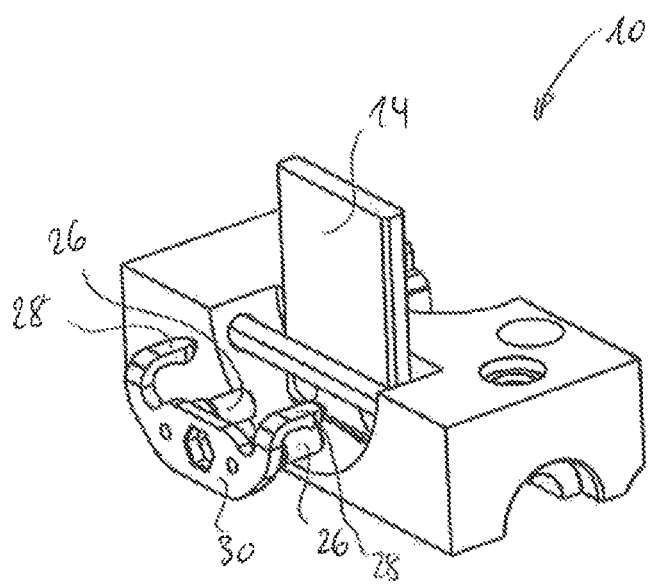
FIG. 4 shows a second embodiment of a coupling device in a perspective partial view from the front showing the coupling element separate from the brake actuation device.
Figure 5:
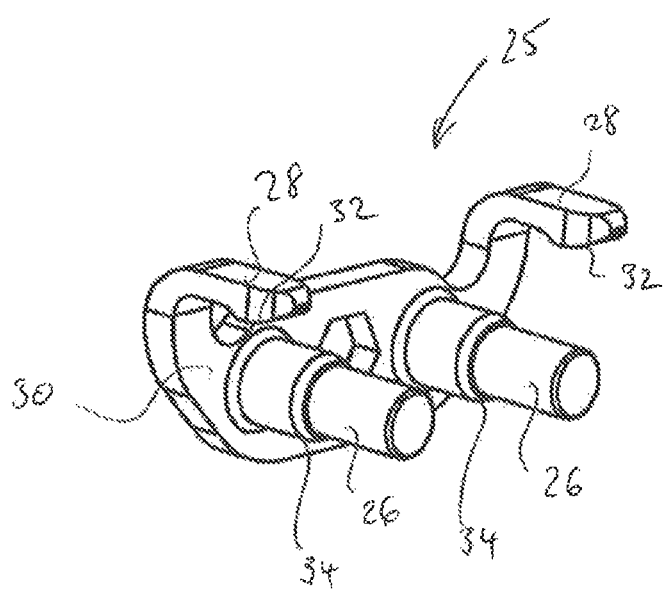
FIG. 5 shows the second embodiment coupling element of the coupling device from FIG. 4 in a perspective detailed view with viewing direction to the strikers.
Figure 7:
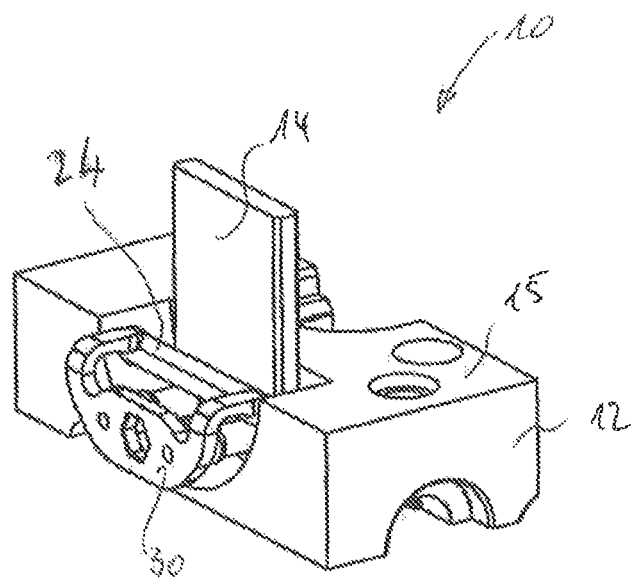
FIG. 7 is showing the second embodiment coupling device from FIG. 4 in a perspective partial view with the coupling element in contact with the bridge element without being locked.
Figure 8:
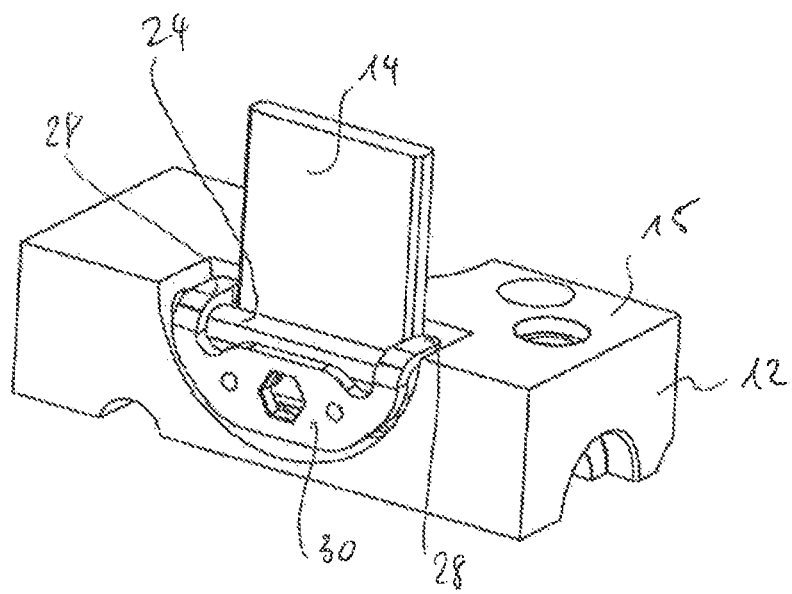
FIG. 8 is showing the coupling device from FIG. 4 in a perspective partial view with the coupling device coupled.
Figure 9:
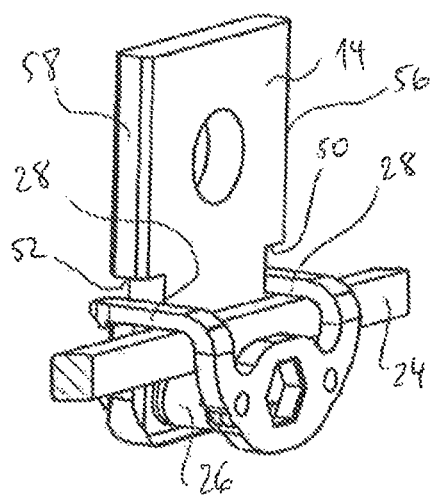
FIG. 9 is showing the coupling element, the coupling extension, and the bridge element of a third embodiment of a coupling device in a perspective detailed view with the coupling device coupled.
Figure 10A:
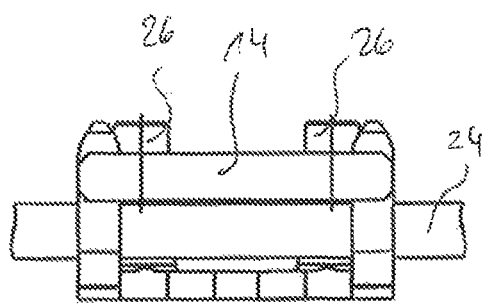
FIG. 10a shows the coupling element, the coupling extension, and the bridge element of the coupling device from FIG. 9 in a first side view with the coupling device coupled.
Figure 10B:
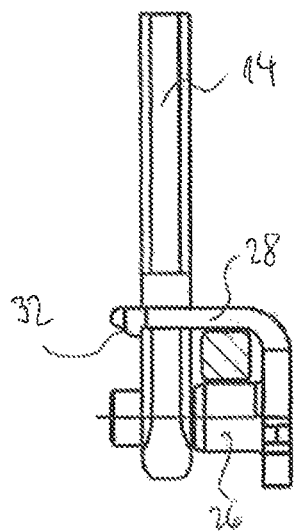
FIG. 10b shows the coupling element, the coupling extension, and the bridge element of the coupling device from FIG. 9 in a second side view with the coupling device coupled.
Figure 10C:
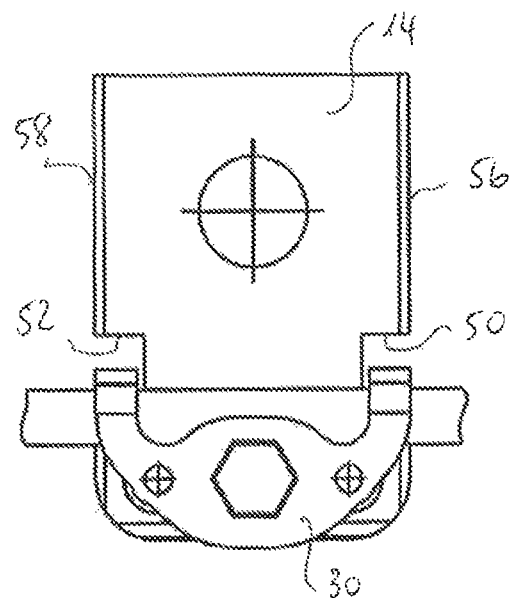
FIG. 10c shows the coupling element, the coupling extension, and the bridge element of the coupling device from FIG. 9 in a third side view with the coupling device coupled.

In the final position of the coupling element 25 shown in FIGS. 3a-c, the locking arms 28 are engaging around the bridge element 24 on the side facing away from the striker 26, wherein the abutment surface 34 rests on the coupling extension 14. The locking arms 28 are forming a locking device, which is keeping the striker 26 engaged with the hole 20. In the final stage, the central longitudinal axis of the bridge element 24 is also aligned vertically to the central longitudinal axis A of the striker 26. Particularly FIG. 3b also shows that the expansion of the coupling extension 14 in a direction parallel to the central longitudinal axis of the bridge element 24 is lower, when coupled, than the extension of the corresponding second recess 18 so that the coupling extension 14 can simply be inserted in the second recess 18. This facilitates the assembly more.

In FIGS. 4 to 8, a coupling device 10 is shown in accordance with a second embodiment, which differs from the coupling device 10 in FIGS. 1 to 3 by its coupling element 25 in such a way that, instead of one striker 26, it shows two essentially identical strikers 26, which are spaced apart from each other. Both strikers 26 of this device 10 are showing the same characteristics as the striker 26 of the first embodiment. Particularly, each of the two strikers 26 is showing an abutment surface 34 extending along its outer circumferential surface. Both abutment surfaces 34 are installed in such a way that they rest on the coupling extension 14, when the coupling device 10 is coupled. In addition, each striker 26 is passing through a first recess 16 configured in the coupling extension 14, corresponding to the respective striker 26 and is engaging with an open hole 20 each configured in the brake actuation device 12 and to the second recess 18. In addition, the coupling device 10 from FIGS. 4 to 8 can show all characteristics of the coupling device 10 from FIGS. 1 to 3.

One device 10 shown in FIGS. 9 and 10a-c in accordance with a third embodiment differs from the coupling device 10 shown in FIGS. 1 to 3 in a way that the locking arms 28 are engaging at the coupling extension 14 and not at the bridge element 24. For this purpose, the coupling extension 14 has notches 50, 52 pushed through by the locking arms 28, when the locking arms 28 are locked. The notches 50, 52 extend in one direction vertically to the principal plane E through the coupling extension 14 and are installed at its longitudinal edges 56, 58. The notches 50, 52 can show a U-shaped profile, if viewed in the principal plane E. Particularly, the notches 50, 52 can extend from the lateral edges 56, 58 in the direction of the center of the coupling extension 14. In addition, the coupling device 10 from FIGS. 9 and 10a-c can show all characteristics of the coupling device 10 from FIGS. 4 to 8.

Although the coupling element 25 is showing two locking arms 28 in all embodiments described in detail above, these locking arms 28 can be integrally configured with each other. In other words, one of the locking arms 28 can extend in one direction vertically to the central longitudinal axis A to the other locking arm 28. It should also be noted that it is more beneficial, if the strikers 26 described above are installed (when assembled) in a plane parallel to the principal plane E parallel to the main extension direction of the bridge element 24 closer to the center of the base section 30 than the locking arms 28 (cf. FIGS. 2a and 6a). If the coupling element 25 just shows one striker 26, this one is preferably positioned centered on the base section 30.

Figure 11:
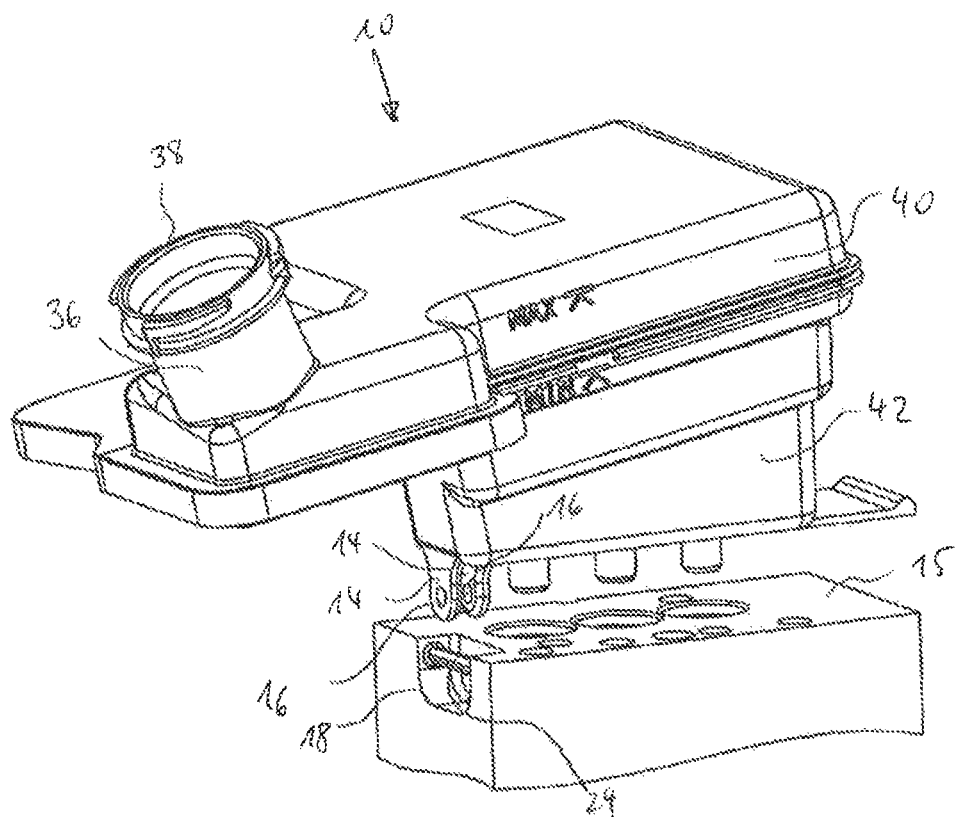
FIG. 11 shows a fourth embodiment of a coupling device in a perspective comprehensive view from the front not showing the coupling element and showing the fluid reservoir separate from the brake actuation device.
Figure 12:
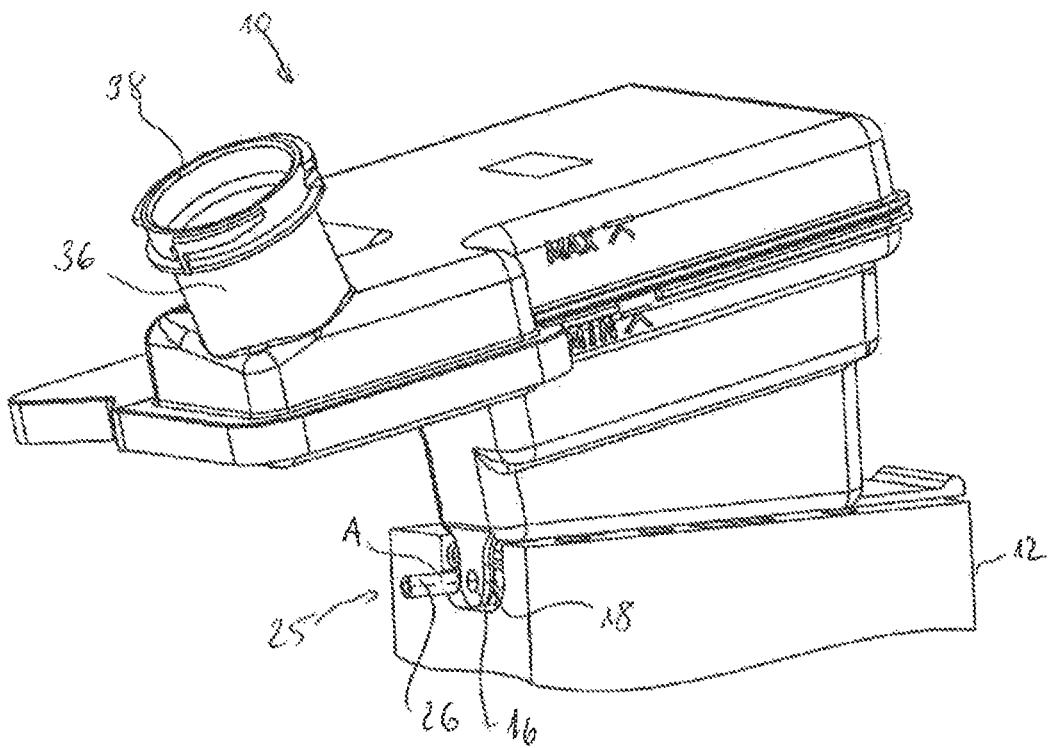
FIG. 12 shows the coupling device from FIG. 11 in a perspective comprehensive view from the front with the fluid reservoir in its end position at the brake actuation device, but not yet coupled to the brake actuation device.

One device 10 shown in FIGS. 11 and 12 in accordance with a fourth embodiment differs from the coupling device 10 shown in FIGS. 1 to 3 in a way that the coupling element 25 shows neither locking arms 28 nor a base section 30. Moreover, the striker 26 is configured as a separate bolt, which is installed on the side of the bridge element 24 opposite to the fluid reservoir 13, as described in the embodiments above. In addition, an additional coupling extension 14 is configured at the fluid reservoir 13 in this device 10, which is equipped like the coupling extension 14 described above. Particularly, the additional coupling extension 14 shows a first recess 16. In the fluid reservoir 13 coupled to the brake actuation device 12, the hole 20 is aligned with the two first recesses 16 along the central longitudinal axis A of the striker 26, while the striker 26 is passing through the first recesses 16 and engaging with the 20. Both coupling extensions 14 are essentially spaced apart here along the central longitudinal axis A of the striker 26 around the diameter of the bridge element 24 in this direction so that they engage around the bridge element 24 fest. In addition, the coupling device 10 from FIGS. 11 and 12 can show all characteristics of the coupling device 10 from FIGS. 1 to 3.

Figure 13:
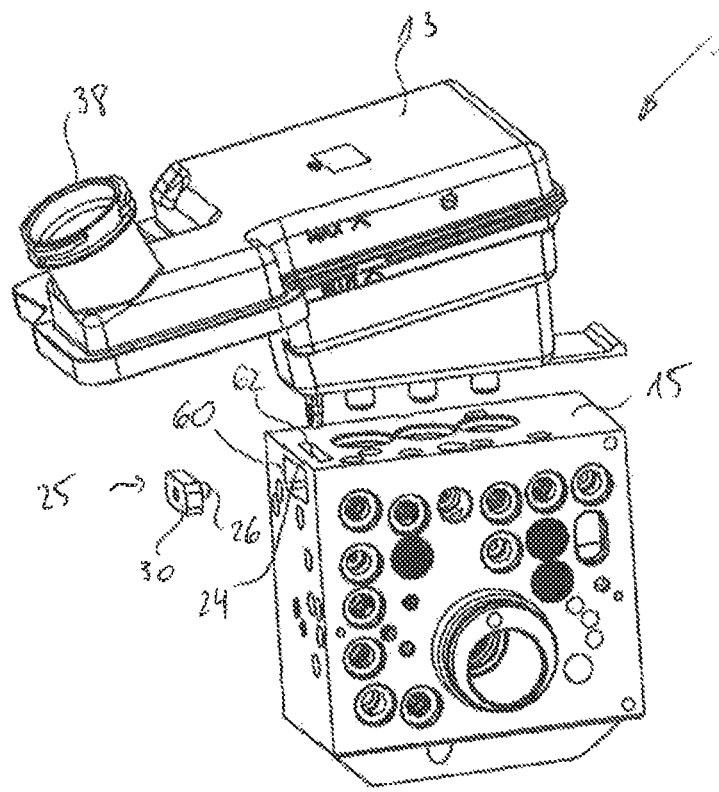
FIG. 13 shows a fifth embodiment of a coupling device in a perspective comprehensive view from the front.
Figure 14:
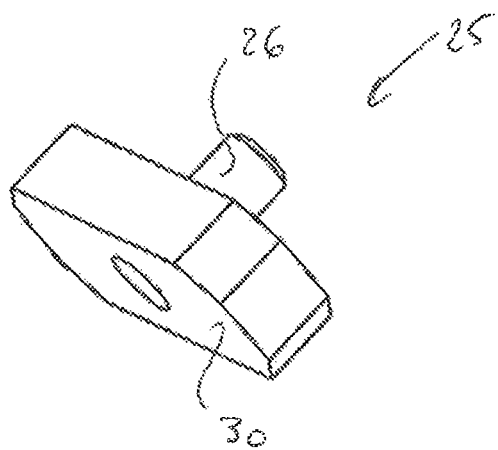
FIG. 14 shows the coupling element of the coupling device from FIG. 13 in a perspective detailed view.
Figure 15:
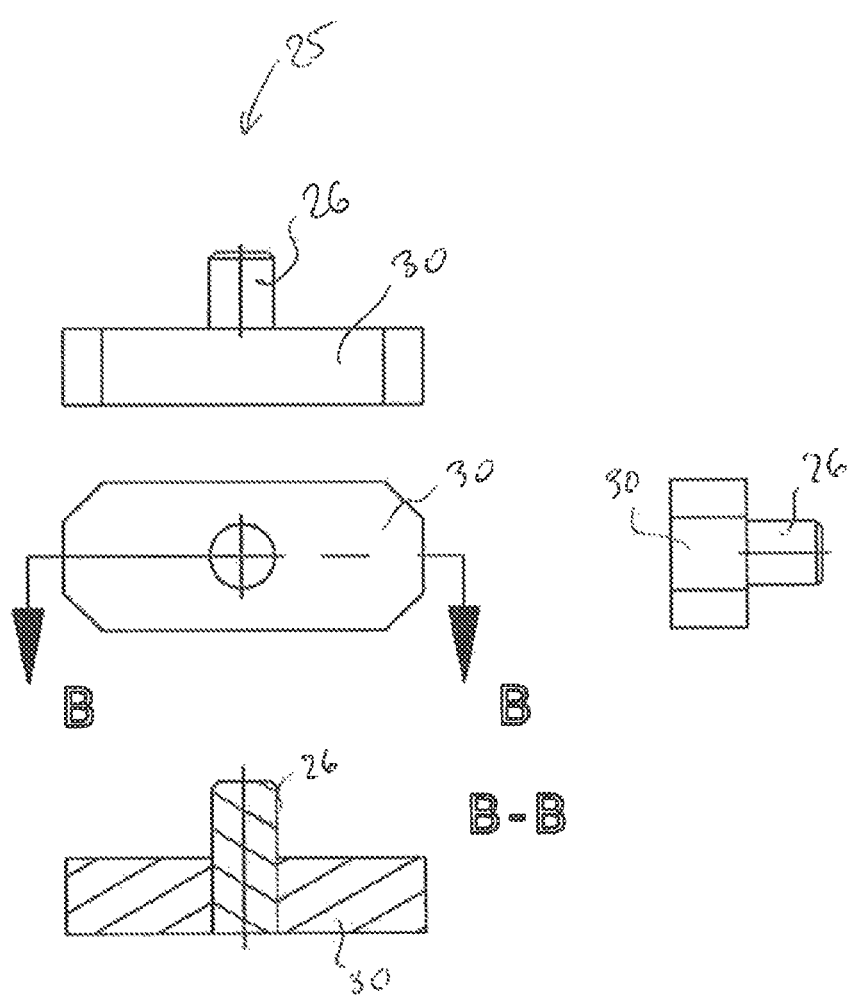
FIG. 15 shows the coupling element of the coupling device from FIG. 13 in different side views and a cross section view.
Figure 16:
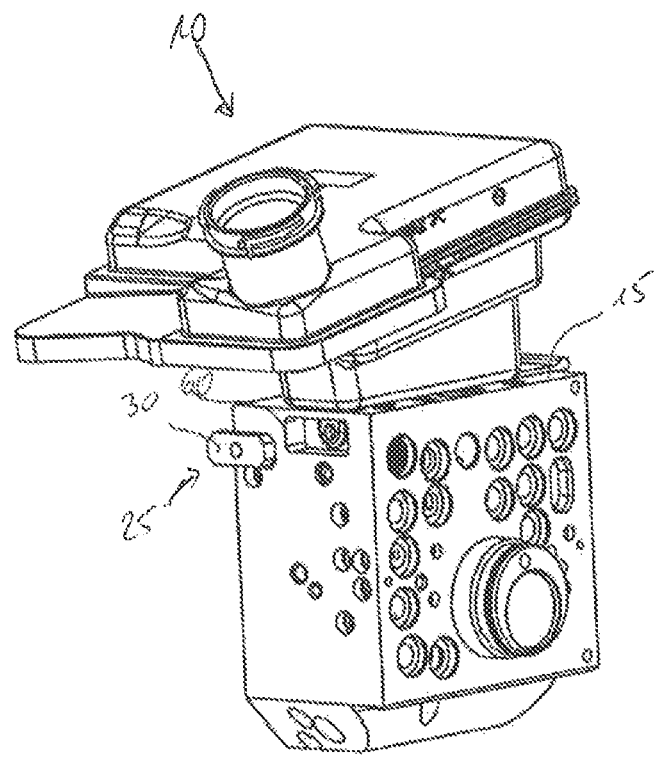
FIG. 16 shows the coupling device from FIG. 13 in a perspective comprehensive view from the front.
Figure 17:
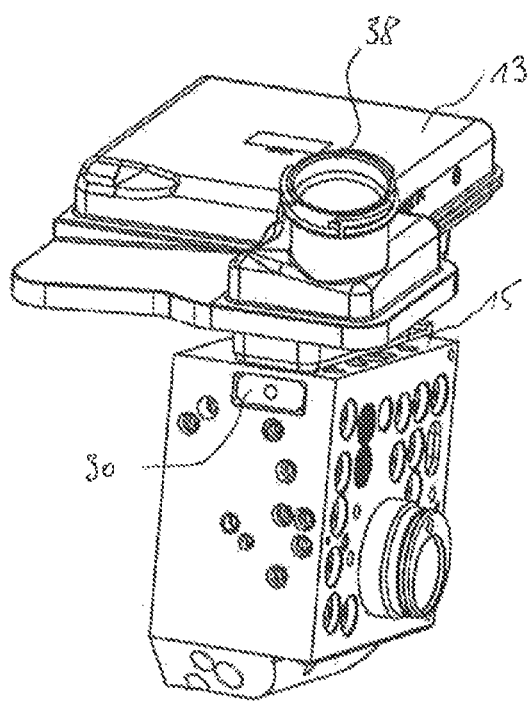
FIG. 17 shows the coupling device from FIG. 13 in a perspective comprehensive view from the front with the fluid reservoir coupled to the brake actuation device.
Figure 18:
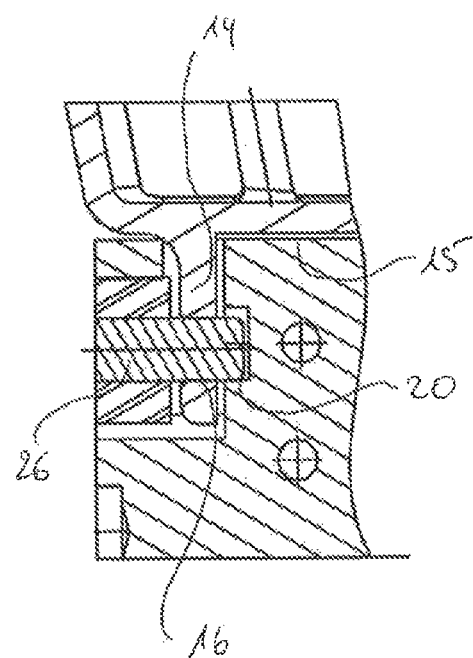
FIG. 18 shows the coupling device from FIG. 13 in a cross-section view with the fluid reservoir coupled to the brake actuation device.

One device 10 shown in FIGS. 13 and 18 in accordance with a fifth embodiment differs from the coupling device 10 shown in FIGS. 1 to 3 in a way that the coupling element 25 shows a base section 30, but no locking arms 28. In this embodiment, the second recess 18 is open to the edge of the brake actuation device 12 via a Fenster 60, whose measurements vertically to the central longitudinal axis A of the striker 26 essentially correspond to the measurements of the base section 30 on this plane so that the base section 30 is positively inserted in the window 60. When coupled, a surface of the base section 30 opposite to the striker 26/to the hole 20 can be aligned with a surface of the brake actuation device 12 adjacent to the window 60. The second recess 18 is also open to the surface 15 facing the fluid reservoir 30 via a slit 62, which is configured so it can positively receive the coupling extension 14. In addition, the coupling device 10 from FIGS. 13 to 18 can show all characteristics of the coupling device 10 from FIGS. 1 to 3.

What is claimed is:

1. A coupling device for coupling a fluid reservoir for a brake fluid with a brake actuation device, including
   at least one coupling extension provided at the fluid reservoir with a first recess,
   a second recess configured in the area of an edge of the brake actuation device as well as a hole configured in the brake actuation device and open to the second recess, the at least one coupling extension extending into the second recess,
   a bridge element crossing the second recess along the edge of the brake actuation device and
   a coupling element with at least one striker,
   wherein the fluid reservoir is coupled to the brake actuation device such that the hole is aligned with the first recess along a central longitudinal axis of the striker and the striker passes through the first recess and engages with the hole.

2. The coupling device in accordance with claim 1 wherein the coupling extension is configured as a flat tab.

3. The coupling device in accordance with claim 1 wherein the coupling element is equipped to secure the coupling extension in the second recess, when the fluid reservoir is coupled to the brake actuation device.

4. The coupling device in accordance with claim 1 wherein the coupling element has a locking device, which is equipped to keep the striker engaged with the hole, when the fluid reservoir is coupled to the brake actuation device.

5. The coupling device in accordance with claim 4 wherein the locking device has at least one locking arm connected with the striker over a base section.

6. The coupling device in accordance with claim 5 wherein the locking arm is at least in sections elastic, and/or wherein the striker essentially extends parallel to the locking arm and/or is spaced apart from the locking arm.

7. The coupling device in accordance with claim 4 wherein the locking device is equipped to engage at the bridge element and/or at the coupling extension.

8. The coupling device in accordance with claim 5 wherein, when the fluid reservoir is coupled to the brake actuation device, the bridge element is installed between the base section and the coupling extension and/or between the locking arm and the striker.

9. The coupling device in accordance with claim 1 wherein several coupling extensions are provided at the fluid reservoir, which, when the fluid reservoir is coupled to the brake actuation device, engage in the second recess.

10. The coupling device in accordance with claim 1 wherein the striker is configured as a separate bolt, which, when the fluid reservoir is coupled to the brake actuation device, is installed on the side of the bridge element opposite to the fluid reservoir.

11. The coupling device in accordance with claim 1 wherein a central longitudinal axis of the bridge element is aligned vertically to the central longitudinal axis of the striker, when the fluid reservoir is coupled to the brake actuation device.

12. The coupling device in accordance with claim 1 wherein the coupling element and the bridge element are configured separately from each other, and/or wherein the bridge element is configured integrally with the brake actuation device.

13. The coupling device in accordance with claim 1 wherein the at least one coupling extension extends between the bridge element and the hole.

14. The coupling device in accordance with claim 1 wherein the bridge element is spaced from the hole.

15. The coupling device in accordance with claim 1 wherein the hole and the striker are unthreaded and the striker slidably engages the hole.

* * * * *